(12) United States Patent
Creamer et al.

(10) Patent No.: US 9,488,072 B2
(45) Date of Patent: Nov. 8, 2016

(54) METHOD FOR OPERATING A POWER PLANT AND GAS TURBINE UNIT FOR IMPLEMENTING THE METHOD

(75) Inventors: Stephen Lawrence Thomas Creamer, Greenfield (GB); Floris Van Straaten, Eggenwil (CH); Jörg Pfistner, Wettingen (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 1086 days.

(21) Appl. No.: 13/350,779

(22) Filed: Jan. 15, 2012

(65) Prior Publication Data

US 2012/0222425 A1 Sep. 6, 2012

(30) Foreign Application Priority Data

Jan. 18, 2011 (CH) ........................ 0083/11

(51) Int. Cl.
*F02C 6/18* (2006.01)
*F01D 25/28* (2006.01)
*F24D 5/02* (2006.01)

(52) U.S. Cl.
CPC .............. *F01D 25/28* (2013.01); *F02C 6/18* (2013.01); *F24D 5/02* (2013.01); *F24H 2240/12* (2013.01)

(58) Field of Classification Search
CPC ............. F02C 6/18; F24D 5/02; F02G 1/00; F02G 1/02; F02G 3/00
USPC ................... 60/39.5–39.59, 266, 267
See application file for complete search history.

(56) References Cited

U.S. PATENT DOCUMENTS

| | | | | |
|---|---|---|---|---|
| 5,417,051 A | * | 5/1995 | Ankersmit | F01K 23/067 429/425 |
| 6,105,362 A | * | 8/2000 | Ohtomo | F01K 23/10 60/39.182 |
| 6,663,011 B1 | * | 12/2003 | Entleutner | F02C 6/18 237/12.1 |
| 7,690,582 B2 | * | 4/2010 | Matsui | B01D 53/06 236/44 C |
| 8,807,989 B2 | * | 8/2014 | Armstrong et al. | 431/12 |
| 2002/0023426 A1 | | 2/2002 | Schroeder et al. | |
| 2002/0040575 A1 | * | 4/2002 | Okano | F02C 6/18 60/39.511 |
| 2003/0000209 A1 | | 1/2003 | Madl | |
| 2004/0237540 A1 | | 12/2004 | Okano et al. | |
| 2005/0206167 A1 | * | 9/2005 | Gehret, Jr. | B60L 3/003 290/2 |
| 2010/0154455 A1 | * | 6/2010 | Yoon | F24F 3/1423 62/271 |

FOREIGN PATENT DOCUMENTS

| | | |
|---|---|---|
| CA | 2477917 A1 | 5/2003 |
| WO | 0146565 A1 | 1/2012 |

OTHER PUBLICATIONS

Sophie Punte, Peter Repinskii: "Thermal Energy Equipment: Waste Heat Recovery" United Nations Environment Programme (UNEP), Jan. 4, 2006, pp. 1-18.

* cited by examiner

*Primary Examiner* — Craig Kim
(74) *Attorney, Agent, or Firm* — Buchanan Ingersoll & Rooney PC

(57) ABSTRACT

A method is provided for operating a power plant, having a waste heat-generating gas turbine unit and also rooms which are to be air conditioned. Waste heat, which is discharged directly to the outside of the gas turbine unit, is used for heating the rooms which are to be air conditioned. A gas turbine for carrying out the method is also provided.

11 Claims, 4 Drawing Sheets

METHOD FOR OPERATING A POWER PLANT AND GAS TURBINE UNIT FOR IMPLEMENTING THE METHOD

CROSS REFERENCE TO RELATED APPLICATION

The present application hereby claims priority under 35 U.S.C. Section 119 to Swiss Patent application number 000083/11 filed Jan. 18, 2011, the entire contents of which are hereby incorporated by reference.

FIELD OF INVENTION

The present invention relates to the field of power plants with gas turbine units. It refers to a method for operating a power plant and a gas turbine unit for implementing the method.

BACKGROUND

Power plants are operated in the most diverse environments and are therefore exposed to the most diverse environmental conditions. The majority of power plants operate within a wide range of environmental conditions and especially of ambient temperatures which depend upon the time of day and the time of year.

According to FIG. 4, in addition to a hall 24 in which a gas turbine unit 10 is accommodated, such a power plant 33 comprises additional buildings 34, 35 and 36 in which other plant sections, office spaces, control equipment or the like are accommodated.

Depending upon the respective environmental conditions, these buildings 34, 35 and 36, depending upon requirement, are heated, ventilated or air conditioned (heating, ventilation, air conditioning—HVAC). In the case of ventilation, the air mass flow which is required for this is open or closed loop controlled by means of frequency-controlled blowers or fans or by means of parallel operation of a greater or lesser number of blowers. In the case of heating, the heating capacity can be open or closed loop controlled. In any case, an HVAC system requires significant additional energy if the ambient temperatures are low or high.

On the other hand, the gas turbine unit 10, which is provided in the power plant 33, generates a significant level of waste heat which has to be discharged to the outside by means of suitable measures.

The schematic diagram of such a gas turbine unit 10 is shown in FIG. 1. The gas turbine unit 10 comprises a gas turbine 14, a diffuser 15 connected downstream, and a generator 16, driven by the gas turbine 14, for generating electric power. The gas turbine 14 draws in fresh air 22 by a compressor 17, compresses this air and discharges the compressed air as combustion air to a combustion chamber 18 where it is used for combusting a fuel 23. The resulting hot gas 20 is expanded in a subsequent turbine 19, performing work, and then enters the diffuser 15 in order to be finally discharged to the outside as exhaust gas 21.

For sound attenuation reasons, there is typically a gas turbine enclosure 11, which encloses the gas turbine 14, a diffuser enclosure 12, which encloses the diffuser 15, and a generator enclosure 13, which encloses the generator 16. In these enclosures 11, 12 and 13, waste heat accumulates during operation and has to be discharged from said enclosures. Corresponding ventilation devices are described in US 2002/0023426 A1, for example. Since the second radial bearing of the gas turbine 14 is arranged in the diffuser, the diffuser enclosure 12 in particular must be well ventilated. Furthermore, attention has to be paid to the fact that an explosion protection has to be provided for the gas turbine enclosure 11, whereas the diffuser enclosure 12 is not subjected to these limitations.

It has already been proposed (WO 01/46565 A1) in the past to use an air conditioning system—which is connected to a cooling circuit—in a power plant for the air conditioning of an operational equipment container, in order to minimize the electric power requirement for the air conditioning system by utilizing the energy which is present in the cooling circuit.

Such a connection between a cooling circuit of the power plant and an air conditioning system of a room located in the power plant is comparatively costly because an air conditioning system is not necessary for the connection. Furthermore, costly installations have to be undertaken in the cooling circuit in order to be able to utilize the energy saving.

SUMMARY

The present disclosure is directed to a method for operating a power plant including a waste heat-generating gas turbine unit and rooms to be air conditioned. The method includes using waste heat, which is discharged directly to an exterior of the gas turbine unit, to heat the rooms which are to be air conditioned.

In another embodiment, the present disclosure is directed to a gas turbine unit for implementing the above method. The gas turbine unit is covered by enclosures, in which the waste heat accumulates, and waste heat dischargers are provided to discharge waste heat with exhaust air from the enclosures into the rooms which are to be heated.

BRIEF DESCRIPTION OF THE DRAWINGS

The invention shall subsequently be explained in more detail based on exemplary embodiments in conjunction with the drawing. In the drawing

Figure 1:
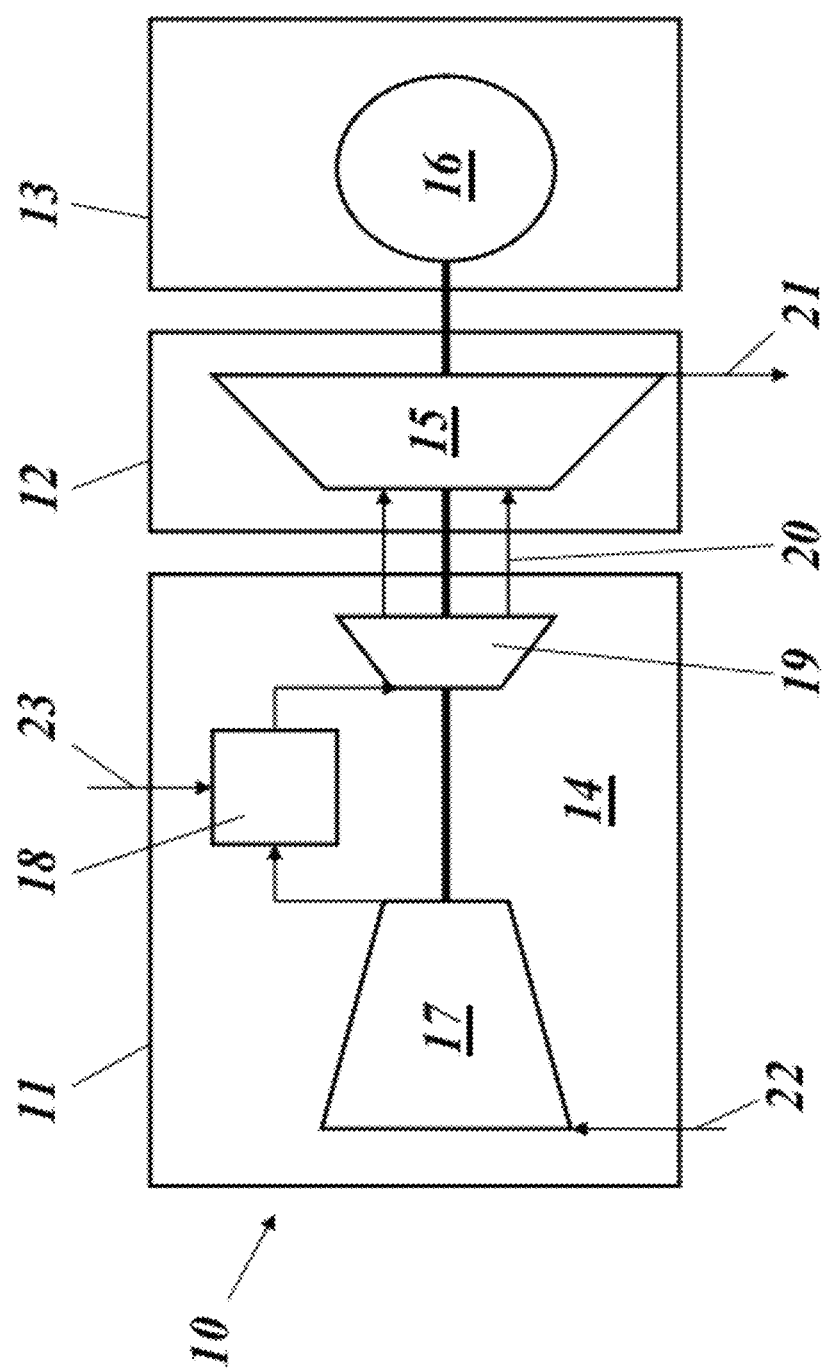
FIG. 1 shows a schematic diagram of a gas turbine unit, covered by enclosures, which can be used for realizing the invention.

DETAILED DESCRIPTION OF THE PREFERRED EMBODIMENTS INTRODUCTION TO THE EMBODIMENTS

It is therefore an object of the invention to disclose a method of the type referred to in the introduction for operating a power plant, which enables an energy-saving air conditioning of rooms, which are provided in the power plant, at little cost and with simple means, and also to disclose a gas turbine unit for implementing the method.

According to the invention, in a power plant, which comprises a waste heat-generating gas turbine unit and rooms which are to be air conditioned, energy is saved by the waste heat—which is discharged directly to the outside—of the gas turbine unit being used for heating the rooms which are to be air conditioned.

In one development of the method according to the invention, the gas turbine unit is covered by enclosures, in which the waste heat accumulates, and the waste heat which is used for heating is provided by means of an exchange of air in the enclosures.

If the gas turbine unit comprises a gas turbine, a diffuser arranged at the hot gas exit of the gas turbine and a generator driven by the gas turbine, which is covered by an associated enclosure, the exchange of air in this case is preferably carried out in the diffuser enclosure and/or in the generator enclosure. Since these spaces do not pose an explosion hazard, heat exchangers can be dispensed with in this case without difficulty.

In another development of the method according to the invention, the gas turbine unit is covered by enclosures, in which the waste heat accumulates, and the waste heat which is used for heating is discharged by means of air-to-air heat exchangers in the enclosures.

If the gas turbine unit comprises a gas turbine, a diffuser arranged at the hot gas exit of the gas turbine and a generator driven by the gas turbine, which is covered by an associated enclosure, the air-to-air heat exchangers are preferably arranged in the gas turbine enclosure.

According to another development, the air mass flows which are required for the exchange of air or for the operation of the air-to-air heat exchangers are provided by blowers.

According to a further development of the invention, the air mass flows which are provided by the blowers are open or closed loop controlled by a control unit.

In particular, the blowers are driven by frequency-controlled motors.

In another development of the method according to the invention, some of the waste heat of the gas turbine unit is utilized for heating the rooms which are to be air conditioned and the remainder, which is not utilized, is discharged to the outside environment.

It is conceivable in this case that switching can be carried out between utilization and non-utilization of the waste heat, and that the utilization of the waste heat is carried out in an interval-controlled or interval-regulated manner.

It is also conceivable, however, that the proportions of the utilized and non-utilized waste heat can be varied via controlled flaps, and that the utilization of the waste heat is open or closed loop via the position of the controlled flaps.

In the gas turbine unit for implementing the method according to the invention, the gas turbine unit is covered by enclosures, in which the waste heat accumulates, and a waste heat discharger is provided to discharge waste heat with exhaust air from the enclosures into the rooms which are to be heated.

In particular, the waste heat discharger comprises blowers which are connected to a control unit.

In one development, the waste heat discharger comprises air guides by which the exhaust air from an enclosure can be selectively diverted into the outside environment or into the rooms which are to be heated.

In a further development, the waste heat discharger comprises air-to-air heat exchangers, arranged in the enclosure, the outlets of which can be selectively connected to the outside environment or to the rooms which are to be heated.

DETAILED DESCRIPTION

Within the scope of the present invention, in a power plant, energy from heat sources in areas which require ventilation is used for heating other areas when the power plant is operated when outside temperatures are low. In this way, auxiliary energy required for heating purposes in the machine hall or in the office buildings can be reduced. If the outside temperatures rise and no heating, or little heating, is required, the energy from the heat sources can be discharged to a greater or lesser extent directly to the outside environment. The overall energy balance of the power plant can be optimized in this way.

Figure 2:
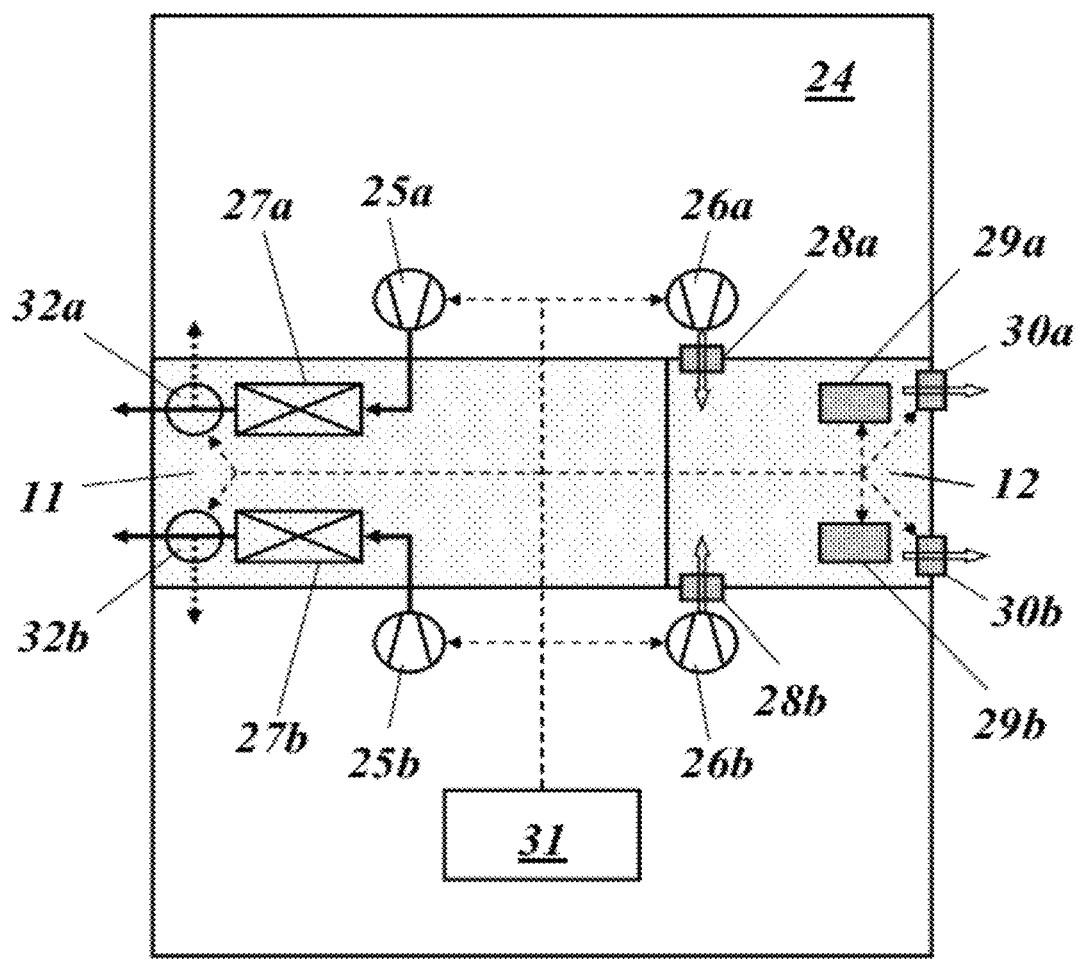
FIG. 2 shows a schematic diagram of a gas turbine unit, accommodated in a machine hall, in which according to an exemplary embodiment of the invention the exhaust air or waste heat from the enclosures is discharged to a greater or lesser extent directly to the outside environment when outside temperatures are high.

In the exemplary embodiment of the invention, as seen in FIGS. 2 (summer operation) and 3 (winter operation), a gas turbine unit 10, with the gas turbine enclosure 11 and the diffuser enclosure 12, is accommodated in a machine hall 24. The waste heat which accumulates in the diffuser enclosure 12 is exhausted to the outside environment (FIG. 2) in summer if the ambient temperatures are high. To this end, use is made of blowers 26a and 26b which are controlled by a control unit 31 and which blow in comparatively cool cooling air via air inlets 28a and 28b into the interior of the diffuser enclosure 12. The heated exhaust air makes its way directly to the outside environment via air outlets 30a and 30b (arrows).

During winter operation, if the ambient temperatures are low, the heated exhaust air, in contrast, is discharged into the hall 24 via other air outlets 29a and 29b (FIG. 3) in order to heat said hall 24.

It is clear that the ventilation of the diffuser enclosure 12 can be controlled by the blowers 26a and 26b delivering a greater or lesser amount of mass flow via frequency-controlled drives. Likewise, it is conceivable to operate a mixed drive in which a (variable) portion of the exhaust air is discharged into the outside environment via the air outlets 30a and 30b and the remainder is discharged into the hall 24 via the air outlets 29a and 29b. To this end, provision can be made in the air outlets 29a,b and 30a,b for controllable flaps which are controlled by the control unit 31. It is also conceivable, however, to provide an interval operation, in which in first intervals the exhaust air is discharged into the hall 24 and in second intervals the exhaust air is discharged directly to the outside environment.

For large gas turbines with a power output of more than 50 MW, a heat capacity of 100-400 kW, for example, is provided in the diffuser enclosure 12. The maximum temperature of the exhaust air is between 50° C. and 80° C. For heating the hall 24, the air is kept below 50° C. For this, the exhaust air can also be mixed with fresh air.

Figure 3:
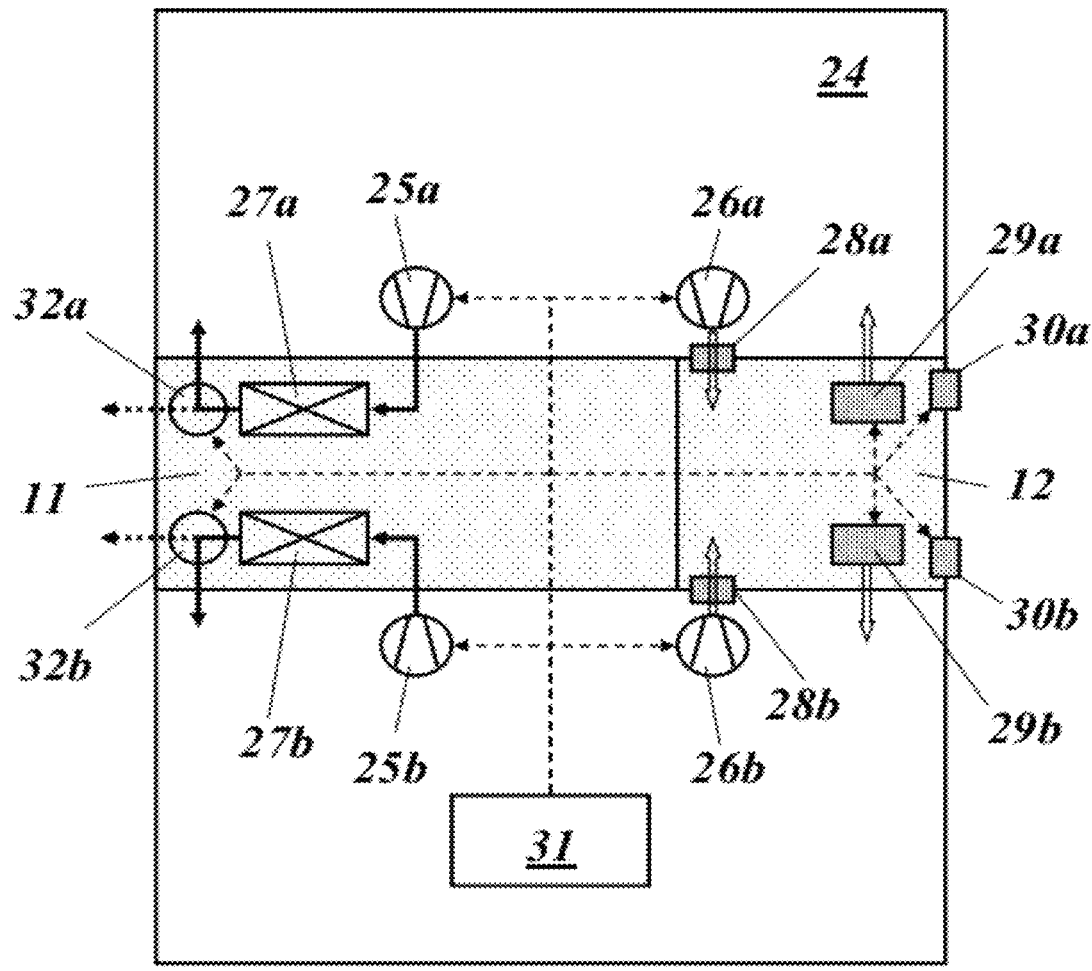
FIG. 3 shows a schematic diagram comparable to FIG. 2, in which the exhaust air or waste heat from the enclosures of the gas turbine unit is used to a greater or less extent directly for heating the machine hall when outside temperatures are low.
Figure 4:
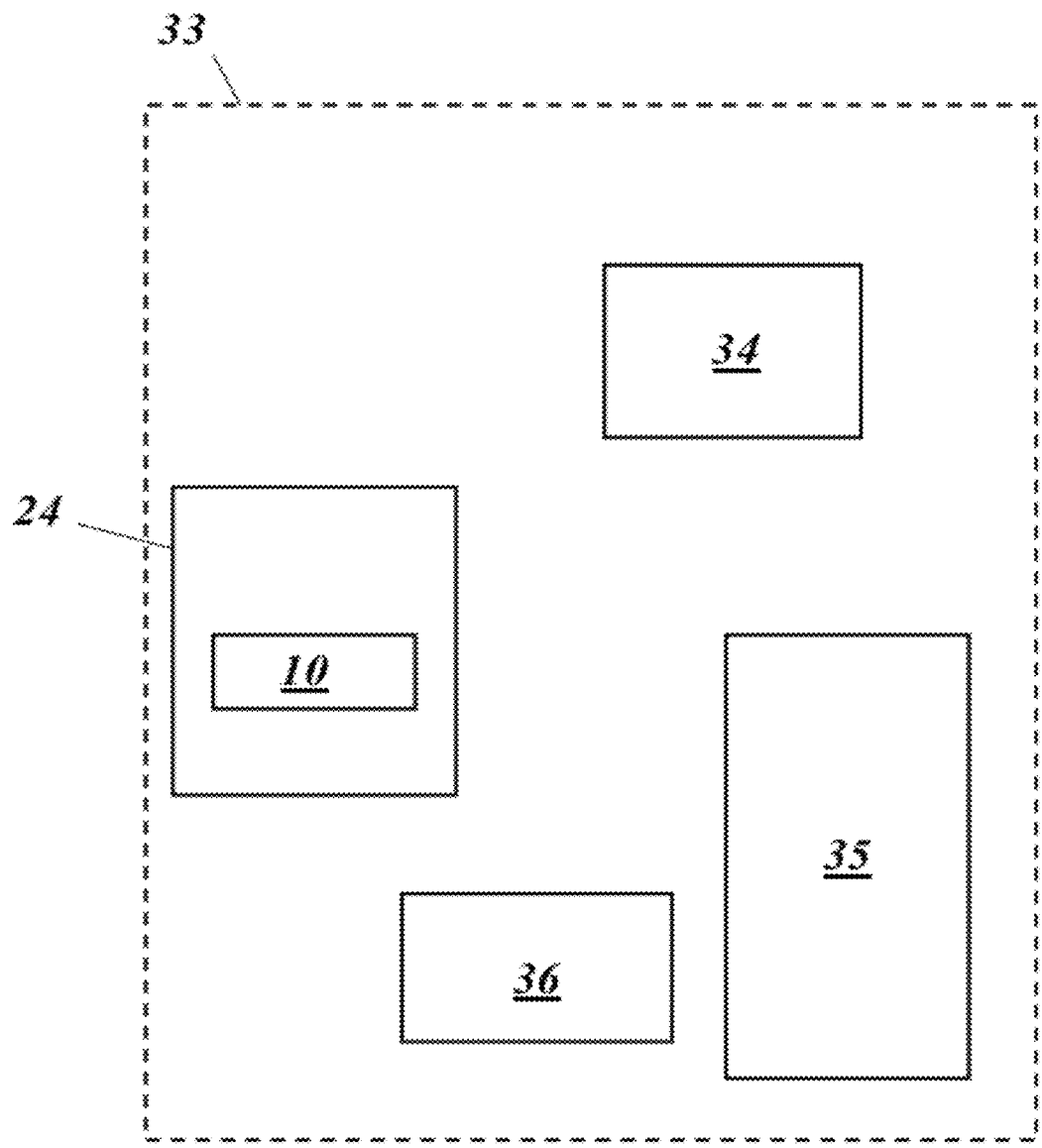
FIG. 4 shows a greatly simplified schematic diagram of a power plant with a gas turbine unit and various buildings which have to be air conditioned or heated.

It is also possible, however, according to FIGS. 2 and 3, to use the waste heat from the gas turbine enclosure 11 for heating purposes. Since in this case there is a risk of explosion, the exhaust air is not used directly, but air-to-air heat exchangers 27a and 27b are used in order to heat the air, which is delivered by corresponding blowers 25a and 25b, with the waste heat of the gas turbine and then to discharge the air either directly to the outside environment (continuous arrows in FIG. 2) or to discharge the air to the surrounding hall 24 for heating purposes (continuous arrows in FIG. 3).

In order to be able to conduct a mixed operation or an interval operation in this case, provision can be made at the outlet of the air-to-air heat exchangers 27a, 27b for suitable switching devices 32a and 32b which enable a partial and/or complete diversion of the heated air issuing from the heat exchangers 27a,b into the hall 24.

LIST OF DESIGNATIONS

10 Gas turbine unit
11 Gas turbine enclosure
12 Diffuser enclosure
13 Generator enclosure
14 Gas turbine
15 Diffuser
16 Generator
17 Compressor
18 Combustion chamber
19 Turbine
20 Hot gas
21 Exhaust gas
22 Fresh air
23 Fuel
24 Hall
25a,b Blower
26a,b Blower
27a,b Air-to-air heat exchanger
28a,b Air inlet
29a,b Air outlet (hall)
30a,b Air outlet (to the outside)
31 Control unit
32a,b Diverting device
33 Power plant
34, 35, 36 Buildings

The invention claimed is:

1. A method for operating a power plant, comprising a waste heat-generating gas turbine unit and rooms to be air conditioned, the method comprising:
    using waste heat, which is discharged directly to an exterior of the waste heat-generating gas turbine unit, to heat the rooms which are to be air conditioned;
    wherein the waste heat-generating gas turbine unit is covered by a plurality of enclosures, the plurality of enclosures including a diffuser enclosure, a generator enclosure, and a gas turbine enclosure, in which the waste heat, which is discharged directly to the exterior of the waste heat-generating gas turbine unit accumulates thereby heating air in the plurality of enclosures, and wherein the waste heat which is used for heating is provided by a heat exchange of heat from the air heated in the diffuser enclosure and/or in the generator enclosure; and
    wherein the waste heat-generating gas turbine unit comprises a gas turbine, a diffuser arranged at a hot gas exit of the gas turbine, and a generator driven by the gas turbine.

2. The method as claimed in claim 1, wherein the waste heat which is used for heating is discharged by air-to-air heat exchangers in at least one of the plurality of enclosures.

3. A method for operating a power plant comprising a waste heat-generating gas turbine unit and rooms to be air conditioned, the method comprising:
    using waste heat, which is discharged directly to an exterior of the waste heat-generating gas turbine unit, to heat the rooms which are to be air conditioned;
    wherein the waste heat-generating gas turbine unit comprises a gas turbine, a diffuser arranged at a hot gas exit of the gas turbine, and a generator driven by the gas turbine, which are each covered by associated enclosures, the associated enclosures including a gas turbine enclosure, a diffuser enclosure, and a generator enclosure, in which the waste heat accumulates thereby heating air in the associated enclosures, and the waste heat which is used for heating is discharged by air-to-air heat exchangers ace arranged in the gas turbine enclosure.

4. A method for operating a power plant comprising a waste heat-generating gas turbine unit and rooms to be air conditioned, the method comprising:
    using waste heat, which is discharged directly to an exterior of the waste heat-generating gas turbine unit, to heat the rooms which are to be air conditioned;
    covering the waste heat-generating gas turbine unit with a plurality of enclosures, in which the waste heat which is discharged directly to the exterior of the waste heat-generating gas turbine unit accumulates thereby heating air in the plurality of enclosures, and wherein the waste heat which is used for heating is provided by a heat exchange of heat from the air heated in at least one of the plurality of enclosures; and
    providing blowers for air mass flows for the heat exchange of the heat from the air heated in the at least one of the plurality of enclosures or for operating air-to-air heat exchangers in the at least one of the plurality of enclosures.

5. The method as claimed in claim 4, wherein the air mass flows which are provided by the blowers are open or closed loop controlled by a control unit.

6. The method as claimed in claim 5, wherein the blowers are driven by frequency-controlled motors.

7. A method for operating a power plant comprising a waste heat-generating gas turbine unit and rooms to be air conditioned, the method comprising:
    using waste heat, which is discharged directly to an exterior of the waste heat-generating gas turbine unit, to heat the rooms which are to be air conditioned, and wherein the waste heat-generating gas turbine unit is covered by at least one enclosure, in which the waste heat accumulates thereby heating air in the at least one enclosure;
    wherein some of the waste heat of the gas turbine unit is utilized for heating the rooms which are to be air conditioned by a heat exchange of heat from the air heated in the at least one enclosure and the remainder, which is not utilized, is discharged to an exterior environment; and
    wherein proportions of the utilized and non-utilized waste heat are varied via controlled flaps, and the utilization of the waste heat is open or closed loop controlled via a position of the controlled flaps.

8. A gas turbine unit for implementing a method for operating a power plant, comprising:
    a waste heat-generating gas turbine unit and rooms to be air conditioned, the method comprising:
        using waste heat, which is discharged directly to an exterior of the waste heat-generating gas turbine unit, to heat the rooms which are to be air conditioned, wherein the waste heat-generating gas turbine unit is covered by a plurality of enclosures, in which the waste heat accumulates, and wherein waste heat dischargers are provided to discharge waste heat with exhaust air from the plurality of enclosures into the rooms which are to be heated; and
    wherein the waste heat dischargers include blowers which are connected to a control unit.

9. The gas turbine unit as claimed in claim 8, wherein the waste heat dischargers comprise air guides, by which the exhaust air from an enclosure of the plurality of enclosures can be selectively diverted into an exterior environment or into the rooms which are to be heated.

10. The gas turbine unit as claimed in claim 8, wherein the waste heat dischargers comprise air-to-air heat exchangers, arranged in an enclosure of the plurality of enclosures, and wherein outlets are selectively connected to an exterior environment or to the rooms which are to be heated.

11. The method as claimed in claim 7, comprising:
  switching between utilization for heating the rooms, which are to be air conditioned, and non-utilization of the waste heat, which is discharged to the exterior environment, and
  wherein the utilization of the waste heat is carried out in an interval-controlled or interval-regulated manner.

* * * * *